United States Patent [19]

Embach

[11] 4,390,234
[45] Jun. 28, 1983

[54] VIEWER/PROJECTOR FOR DISPLAY OF 360 DEGREE HOLOGRAPHIC FILM CASSETTES

[76] Inventor: James T. Embach, 760 Knollwood Ct., Saline, Mich. 48176

[21] Appl. No.: 177,943

[22] Filed: Aug. 14, 1980

[51] Int. Cl.³ .......................... G03H 1/02; G03H 1/22
[52] U.S. Cl. .................... 350/3.65; 350/3.85
[58] Field of Search ............ 350/3.61, 3.62, 3.79, 350/3.65, 3.85, 3.5

[56] References Cited

U.S. PATENT DOCUMENTS

| | | | |
|---|---|---|---|
| 3,537,372 | 11/1970 | Kaswan | 95/16 |
| 4,057,317 | 11/1977 | Upatnieks | 350/3.5 |
| 4,234,244 | 11/1980 | Klein | 350/241 |

OTHER PUBLICATIONS

Jeong et al., "Cylindrical Holography and Some Proposed Applications", *J. Opt. Soc. Am.*, 57, 1396–1398, (1967).
Jeong et al., "The Integration of Motion Pictures into Holograms," SID International Symposium, May 21–23, 1974, pp. 48–49.

*Primary Examiner*—Bruce Y. Arnold
*Assistant Examiner*—William W. Propp
*Attorney, Agent, or Firm*—Barnes, Kisselle, Raisch, Choate, Whittemore & Hulbert

[57] ABSTRACT

A combined viewer and projector for display of holographic films prerecorded in cylindrical configuration at prespecified nominal radius of curvature. The projector and the viewer sections of the apparatus each include mirrors positionable by an operator for defining film-illumination light path having a length corresponding to the path length needed to illuminate the film at the prespecified radius. The film preferably is packaged in a cassette which includes a pair of laterally spaced spools which may be driven in either direction by the apparatus and a frame which guides the film through an arcuate path of prespecified radius of curvature.

16 Claims, 14 Drawing Figures

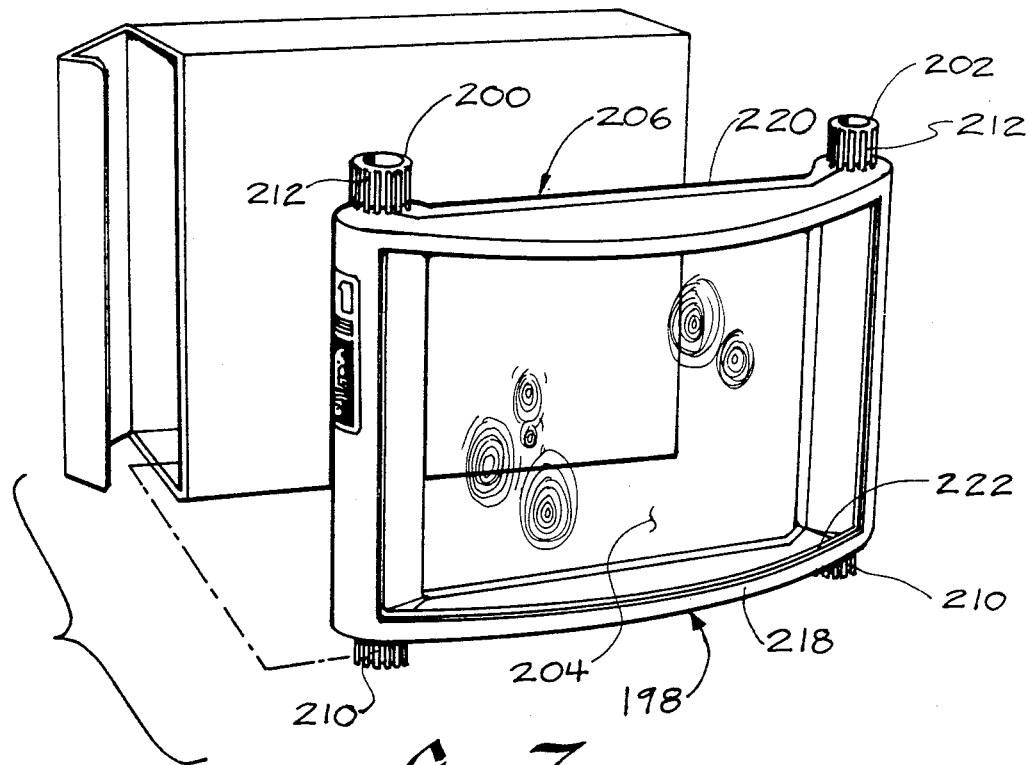
fig-7
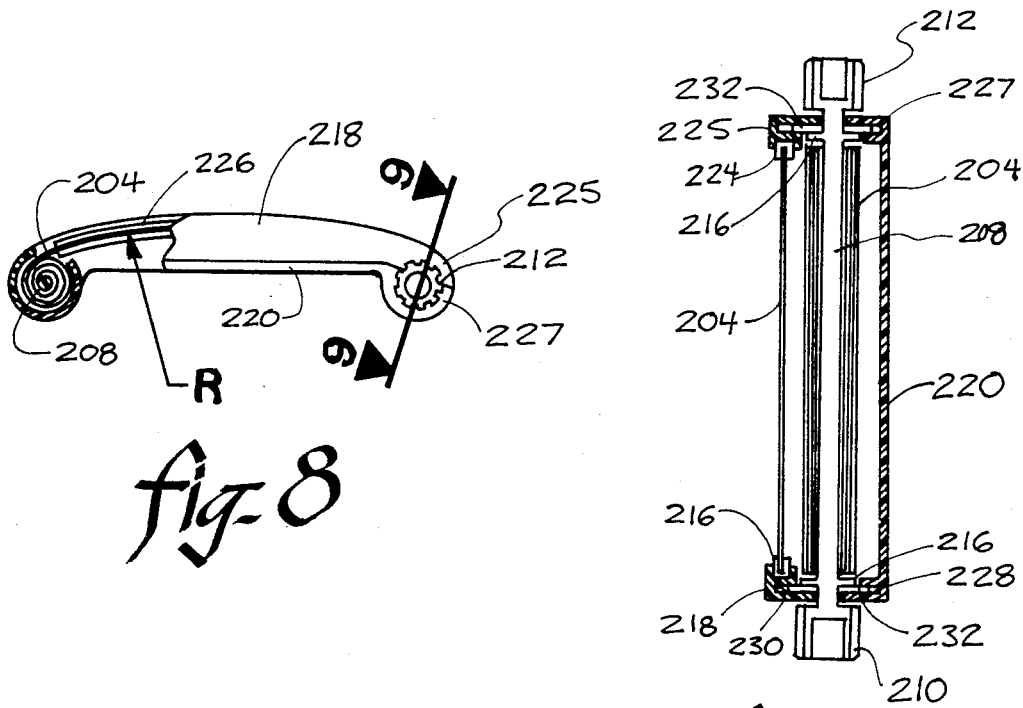
fig-8
fig-9

VIEWER/PROJECTOR FOR DISPLAY OF 360 DEGREE HOLOGRAPHIC FILM CASSETTES

The present invention relates to apparatus for display of prerecorded holographic film, and more particularly to viewers and projectors for display of holographic film prerecorded in an arcuate or cylindrical (360°) film configuration.

As used in the present application and claims, the term "viewer" refers to apparatus for display of prerecorded holographic film to one or more observers positioned adjacent to, usually in front of the apparatus so as to be able to observe illuminated film through an apparatus window. The term "projector" refers to apparatus for projection of a portion of the film as a two-dimensional image as onto a screen or the like. By way of background and prior art, reference may be had to Upatnieks et al, "Archival Storage of Three-Dimensional Images", *International Opt. Conf. Digest*, IEEE Cat. No. 75CH0941-5C, 108-111 (1975); Jeong et al, "360° Holography", *J. Opt. Soc. Am.*, 56, 1263-1264 (1966); Jeong, "Cylindrical Holography and Some Proposed Applications", *J. Opt. Soc. Am.*, 57, 1396-98 (1967); and the U.S. Patent to Upatnieks No. 4,057,317.

An object of the present invention is to provide viewer apparatus, projector apparatus and/or combined viewer/projector apparatus for display of prerecorded holographic film which is economical in assembly, which is adaptable for a wide variety of applications, which may be readily operated by unskilled personnel with minimal introduction, and which is generally designed to accommodate a wide variety of "human engineering" factors.

A further object of the invention is to provide holographic viewer, projector and/or combined viewer/projector apparatus which is adapted to accept for display in the form of standard-size cassettes holographic film prerecorded in an arcuate or cylindrical film configuration. A further and related object of the invention is to provide prerecorded holographic film cassettes in standardized configurations for use in viewer and/or projector display apparatus. Another related object of the invention is to provide viewer and/or projector apparatus for display of holographic film prerecorded as described which will accept a variety of standardized prerecorded film configurations and which may be readily adjusted by an unskilled operator to the particular configuration of the film to be viewed or projected.

The invention, together with additional objects, features and advantages thereof, will be best understood from the following description, the appended claims and the accompanying drawings in which:

Figure 3:
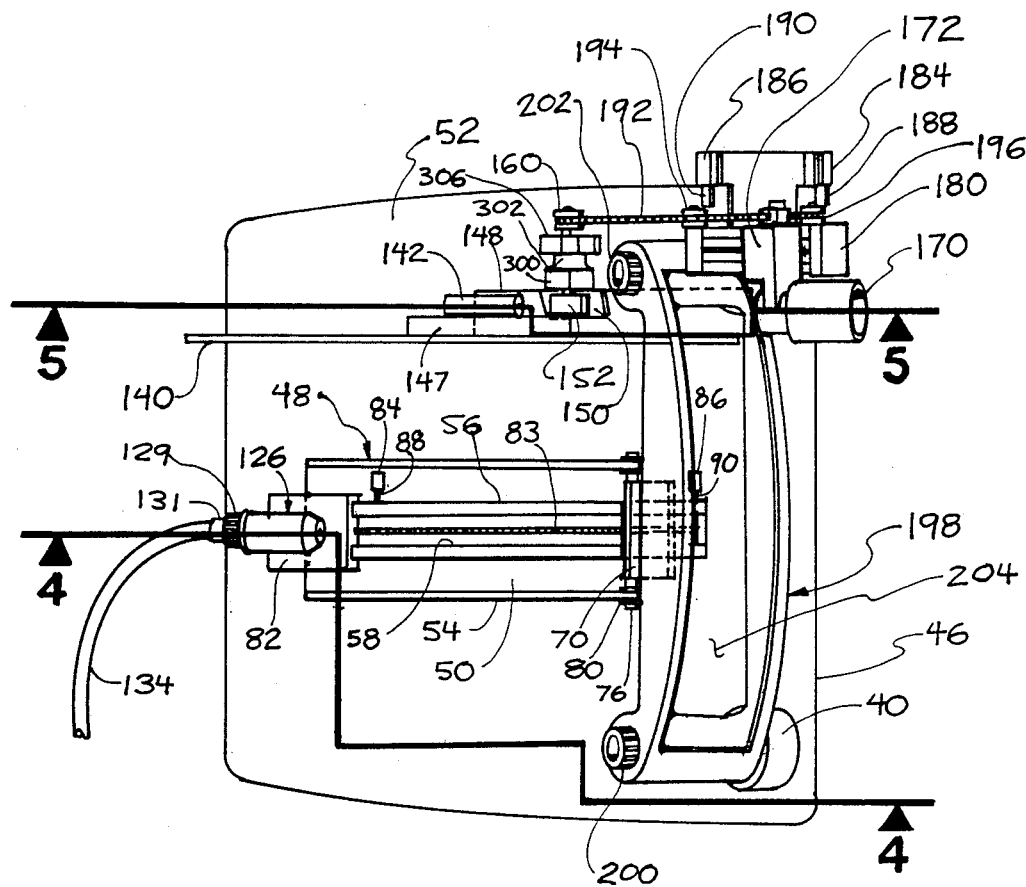
FIG. 3 is a top plan view of the apparatus as illustrated in FIG. 2.
Figure 4:
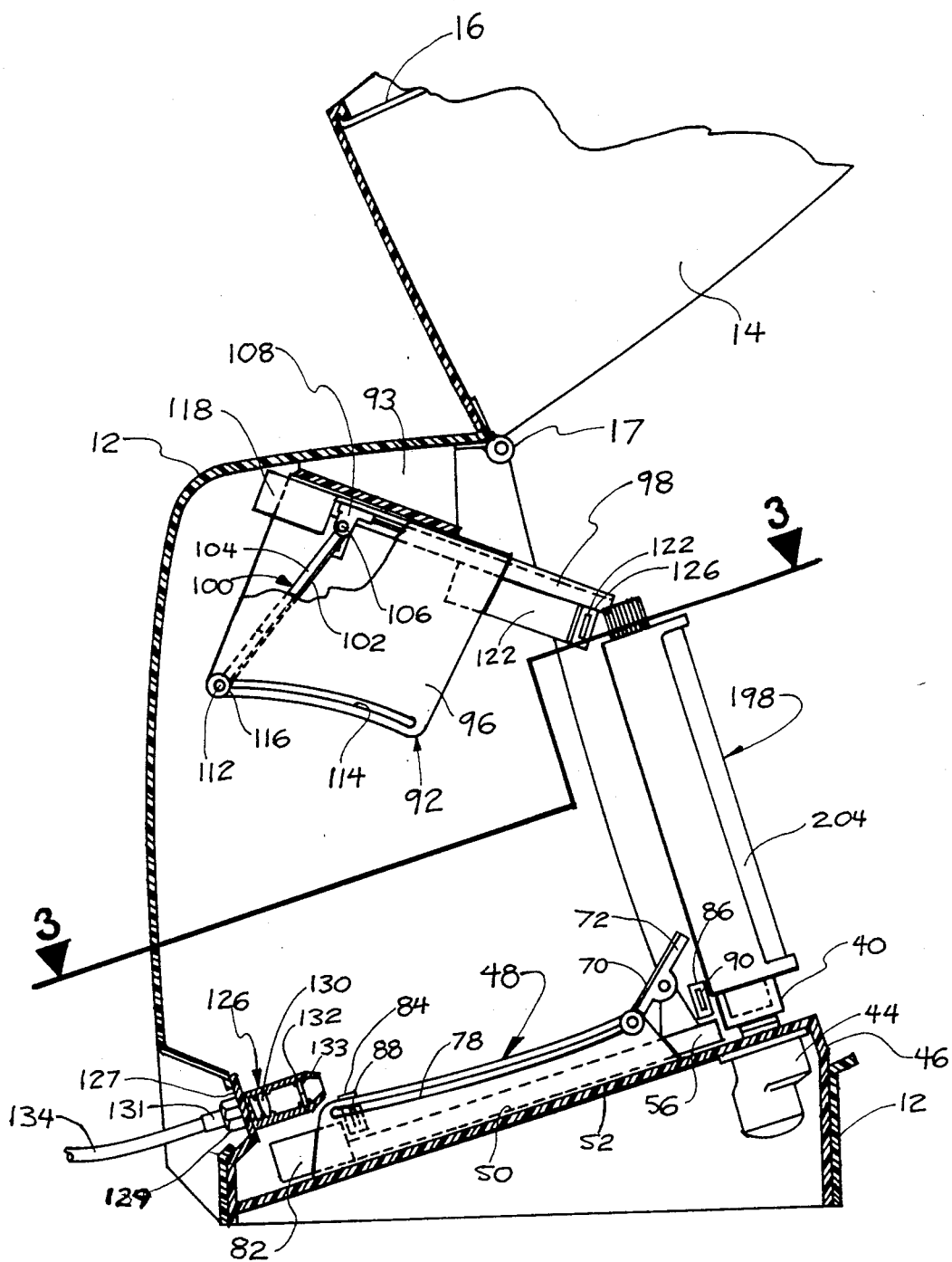
Figure 5:
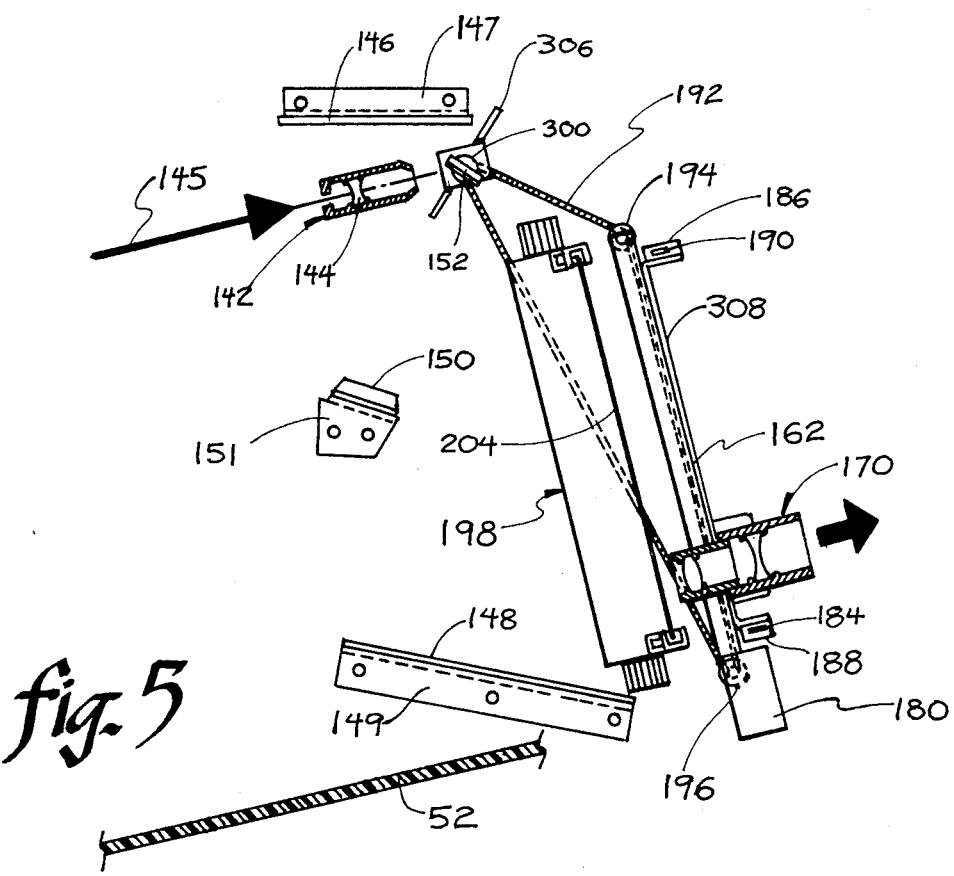
Figure 6:
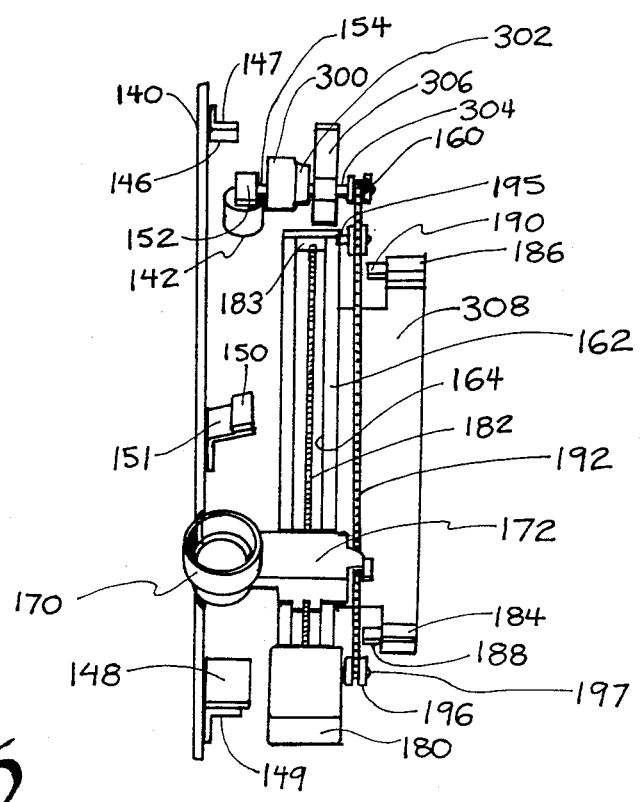
Figure 10:
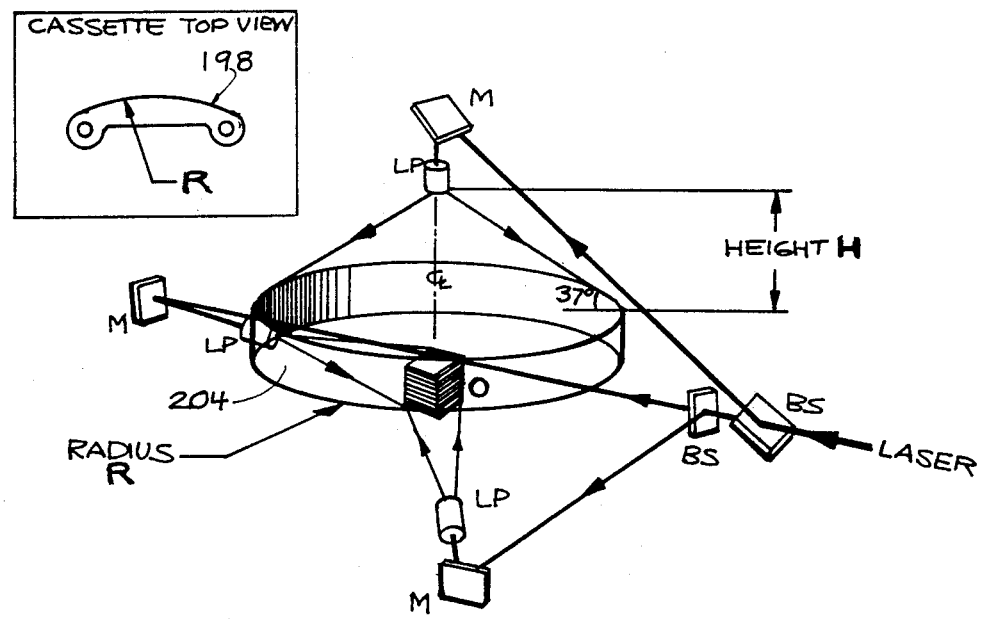
Figure 11:
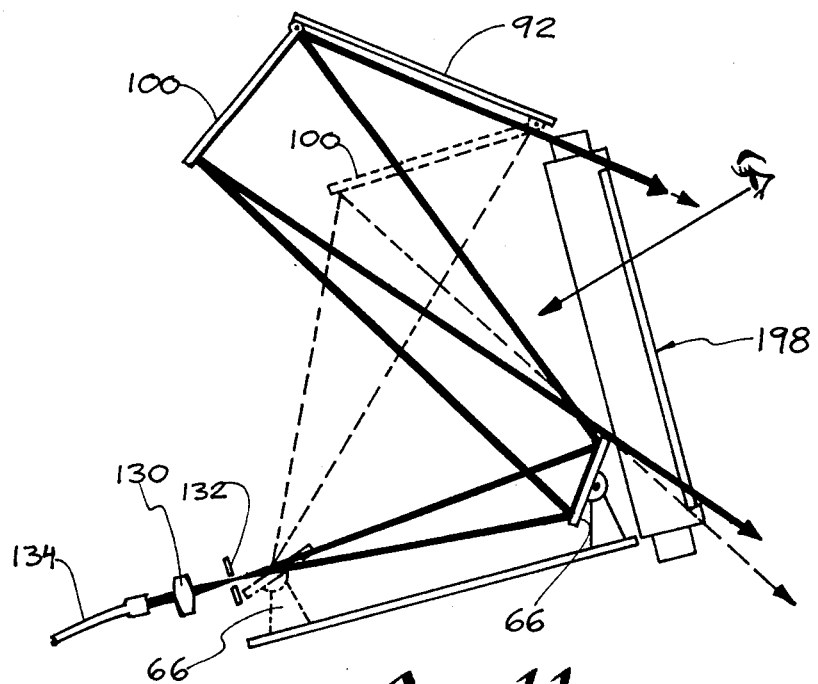
Figure 12:
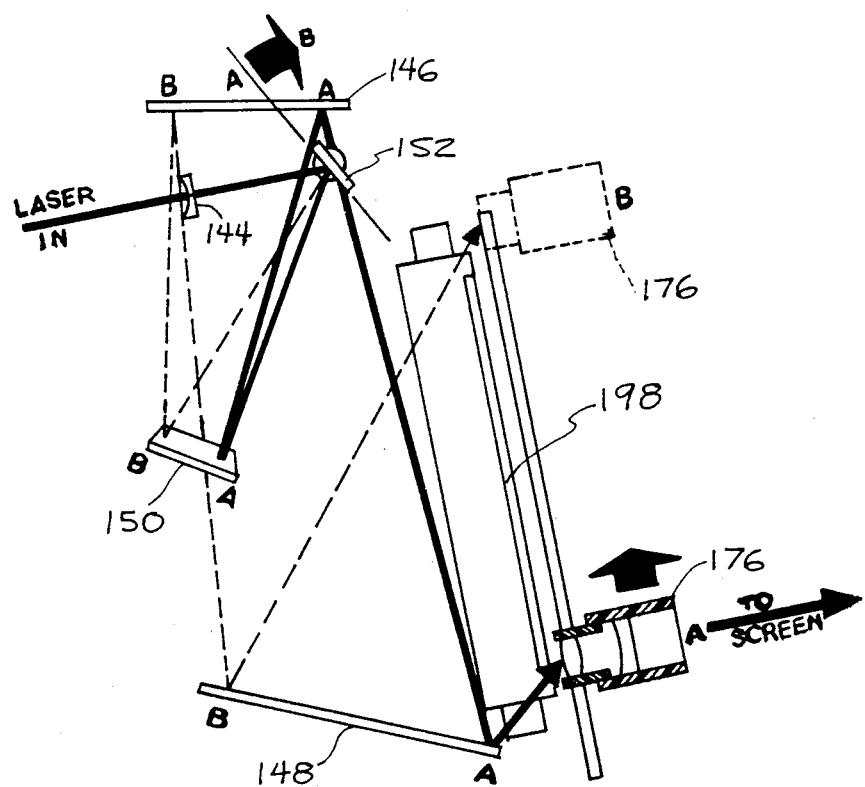
Figure 13:
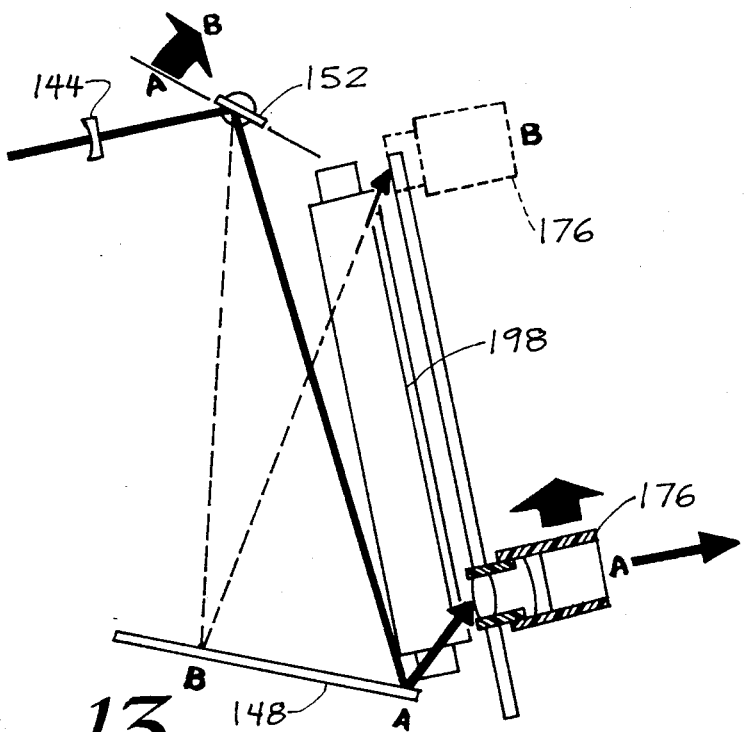
Figure 14:
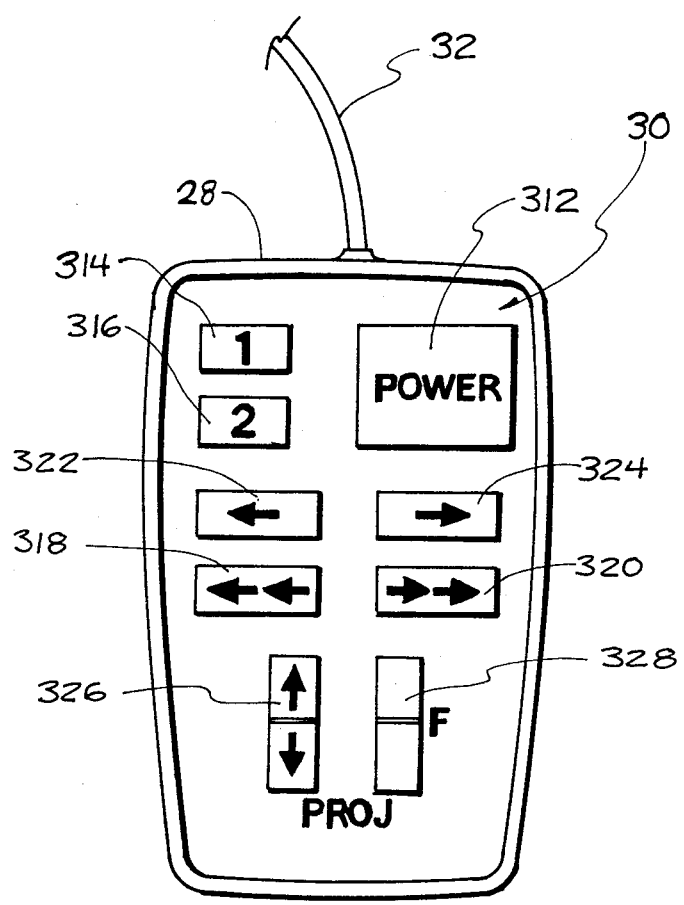

FIGS. 4 and 5 are sectional views essentially taken along the respective lines 4—4 and 5—5 in FIG. 3;

FIG. 6 is a fragmentary front elevational view of a portion of the apparatus as shown in FIG. 5;

FIG. 7 is a perspective view of a holographic film cassette in accordance with the invention;

FIG. 8 is a top plan partially sectioned view of the cassette illustrated in FIG. 7;

FIG. 9 is a sectional view taken along the line 9—9 in FIG. 8;

FIG. 10 is a schematic drawing illustrating a prior art method for prerecording of holographic film for use in the invention;

FIG. 11 is a schematic diagram useful in understanding operation of the invention as a viewing apparatus;

FIGS. 12 and 13 are schematic drawings useful in understanding operation of the invention as a projector apparatus; and FIG. 14 is a magnified top view of the user control counsole showing the various control buttons and indicia.

The preferred embodiment of the present invention illustrated in FIGS. 1-6 of the drawings and to be described in detail hereinafter comprises an apparatus for both viewing and projection of hologrpahic images on film prerecorded in an arcuate or cylindrical film configuration, i.e. a combined viewer/projector apparatus. As the description unfolds, it will become evident that many portions of the combined apparatus are common to both the viewing and projecting modes of operation, while other portions of the apparatus operate in one of such modes of operation and not the other. It will therefore be evident that apparatus only for viewing of prerecorded holographic films could be provided by simply deleting those portions of the combined apparatus unique to the projector mode of operation. Similarly, apparatus only for projection of images recorded on the holographic film could be provided by merely deleting those portions or elements of the combined apparatus which are used solely in the viewing mode of operation. The invention in its broadest aspects is intended to encompass such single-mode apparatus to the extent that it embodies other salient features of the invention common to both the viewing and projecting modes of operation.

As indicated previously, recording of holographic images on film in arcuate or cylindrical film configuration is known in the art. See the following discussion in connection with FIG. 10 and the aforementioned Upatnieks et al article. Cylindrical film configuration is particularly adventageous for archival recording of museum pieces or the like since the object is, in effect, recorded from all directions. It will be understood and appreciated, however, that part-cylindrical or other arcuate film configuration of constant radius could be used where all sides of the object need not be recorded. In this connection, the term "arcuate" as applied to film recording shall refer to a cylindrical or part-cylindrical recording at fixed radius.

Figure 1:
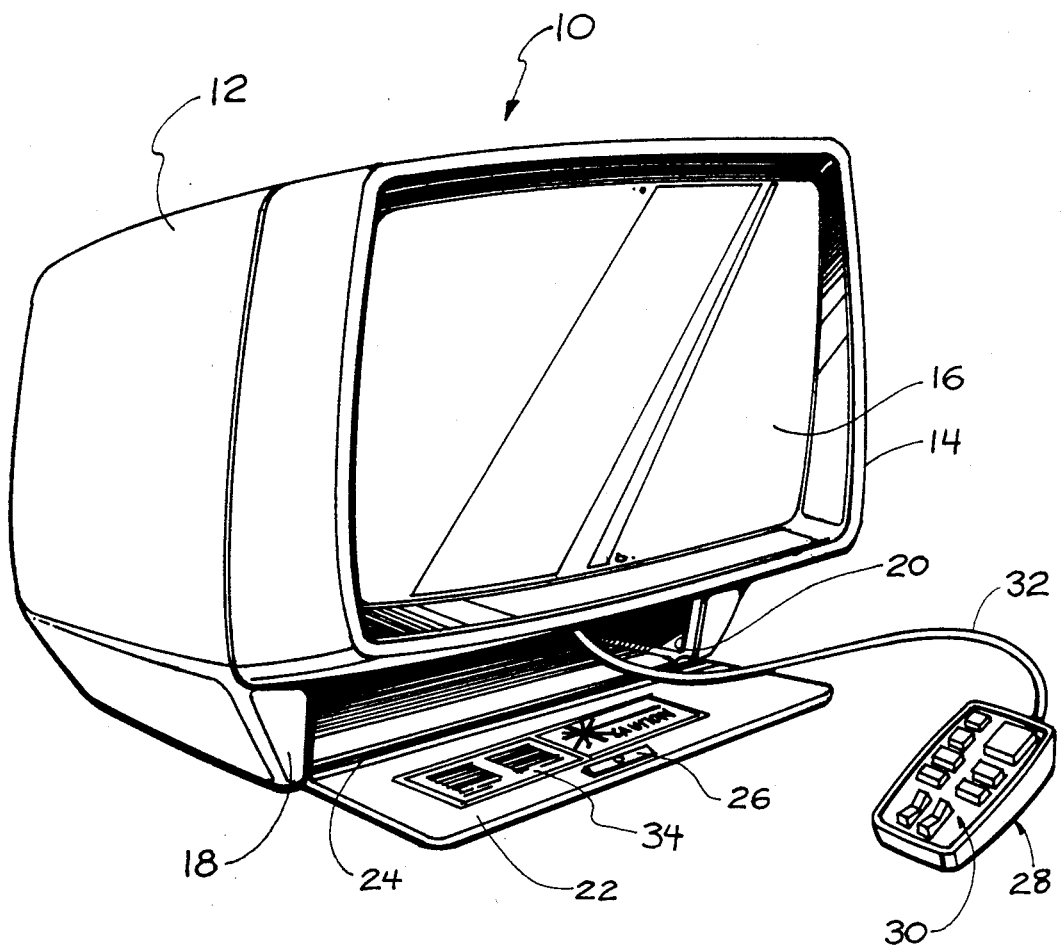
FIG. 1 is a perspective view of a presently preferred embodiment of display apparatus in accordance with the invention for holographic film prerecorded in arcuate or cylindrical film configuration.

Referring to FIG. 1, the preferred embodiment of a combined viewer and projector illustrated therein comprises a housing 10 which includes a rear housing section 12 which encloses the apparatus components to be described, and a front section or cover 14 mounted to rear section 12 as by a hinge 17 (FIG. 4) so as to be adapted to be swung up and away from rear section 12 and thereby afford access to the inside of the apparatus for loading of film cassettes, etc. A viewing window or screen 16 is carried by cover 14. A base portion 18 integral with rear housing section 12 includes a recessed compartment 20 disposed beneath cover 14. A door 22 is mounted as by a hinge 24 to base 18 and includes a magnetic latch 26 for enclosing compartment 20 when cover 22 is positioned flush with the front wall of base 18. A handheld control unit 28, which includes operator-responsive control buttons generally indicated at 30 and electronics (not shown) for operating the apparatus motors, etc. to be described, is connected by an extensible cable 32 to the display apparatus and may be withdrawn from compartment 20 by an operator when door 22 is moved to the open position illustrated in the drawings. A label or the like 34 may be suitably adhered to the inside surface of door 22 for instructing an operator in use of the display apparatus. Preferably, the housing and control unit components are of molded plastic construction, such as injection molded ABS, for example. Screen 16 may comprise abrasion treated injection molded acrylic.

Internally of enclosure 10 and referring to FIGS. 2–6, the display apparatus comprises a pair of laterally spaced internally serrated or splined sockets 40 coupled by corresponding slip clutches 42 to a pair of servomotors 44 operatively connected by cable 32 to control unit 28. Motors 44 are mounted beneath the inclined upper surface 52 of a chassis 46 (FIGS. 3 and 4) adjacent the forward or front chassis edge and with sockets 40 opening upwardly on axes perpendicular to surface 52. Also carried by chassis surface 52 rearwardly of sockets 40, i.e. on a side thereof remote from front cover 14, is a track plate 48 (FIGS. 2–4) having a flat base 50 mounted flush to surface 52 and a pair of side flanges 54 extending upwardly from the lateral edges of base 50. A guide track 56 of machined aluminum or the like is longitudinally carried centrally of base 50 and has a central channel 58 extending throughout its length. A mirror support bracket 60 has a base 62 slidably mounted in channel 58 and a pair of upstanding ears 64 between which a plane mirror assembly 66 is pivotally mounted and retained by a pivot pin 68. Mirror assembly 66 includes a plane first folding mirror 70 adhered or otherwise mounted on a metal base 72 from the back surface of which a pair of ears 74 project to be received over pivot pin 68 between ears 64.

Figure 2:
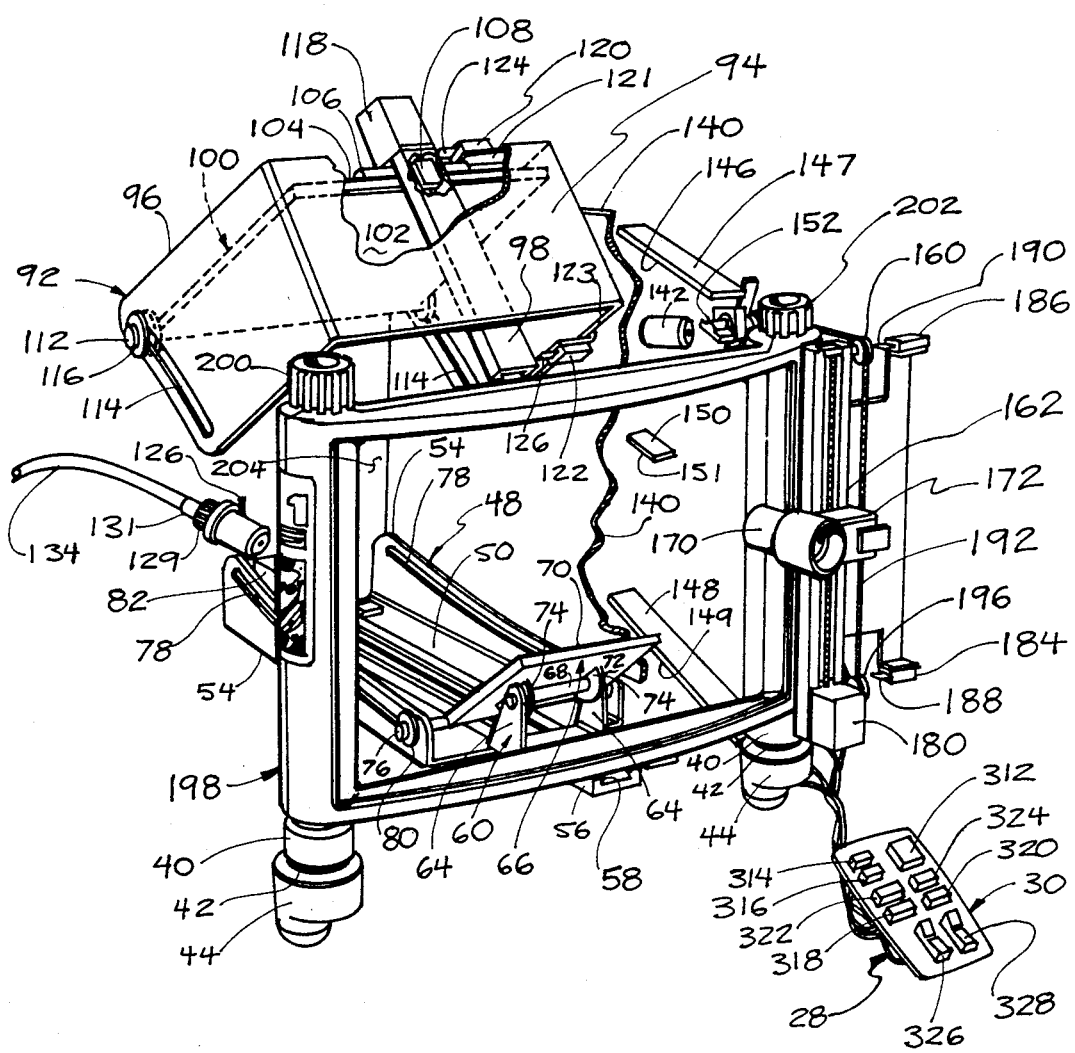
FIG. 2 is a perspective view of the basic components of the apparatus in FIG. 1 with the enclosure or housing removed.

A pair of pins 76 project laterally outwardly from the lower edge of mirror support base 72 through corresponding cam slots 78 (FIGS. 2 and 4) in flanges 54 and are retained therein by the bushing washers 80. Cam slots 78 curve upwardly with respect ot the plane of chassis surface 52 from the forward to the rearward ends of track plate 48, as best seen in FIG. 4. A motor 82 is mounted at the rearward end of the guide track 56 and is coupled to base 62 of mirror support bracket 60 by a lead screw 83 (FIG. 3) which extends longitudinally through channel 58. The end of lead screw 83 remote from motor 82 is supported by a journal (not shown). A pair of limit switches 84, 86 are respectively mounted on base 50 beneath the rearward and forward ends of cam slot 78 and have the respective switch actuators 88, 90 which project laterally into the path of mirror support bracket 60 so as to be respectively responsive to movement of the mirror support bracket by motor 82 to preselected forward and rearward positions in guide 56. Motor 82 and switches 84, 86 are coupled by cable 32 to control unit (FIG. 2).

A second track plate 92 is suspended by a bracket 93 (FIG. 4) depending from an upper wall of enclosure section 12 above chassis surface 52 at a forwardly acute angle with respect thereto, and includes a base 94 and a pair of flanges 96 depending from the lateral edges thereof. A forwardly extending guide track 98 is mounted centrally of support base 94. A mirror assembly 100, comprising a plane second folding mirror 102 adhered to a substrate or base 104, is mounted as by a hinge 106 to a slide 108 slidably mounted in a central channel 110 extending lengthwise of guide track 98. A pair of guide pins 112 laterally project from opposite lower edges of mirror substrate 104 through the corresponding cam slots 114 in flanges 96 and are retained therein by the bushing washers 116. As best seen in FIG. 4, cam slots 114 are downwardly arcuate with respect to the surface 52 of chassis 46. A motor 118 is mounted on base 94 adjacent the rearward end of guide track 98 and is coupled to slide 108 (FIG. 4) by a lead screw (not shown). A pair of limit switches 120, 122 are carried by respective brackets 121, 123 projecting inwardly from one flange 96 adjacent the forward and rearward ends of guide track 98, and have the respective switch actuators 124, 126 disposed in the path of mirror assembly 100 so as to be responsive to movement of the mirror assembly to preselected rearward and forward positions. Motor 118 and switches 120, 122 are coupled by cable 32 (FIG. 2) to control unit 28.

An optical assembly 126 for simulating a point light source is mounted adjacent the rearward end of guide 56 on a projection 128 extending upwardly from chassis surface 52. Assembly 126 comprises a lens 130 and a pinhole filter 132 disposed at the focus of lens 130 on an axis parallel to and vertically coplanar with the axis of mirror guide channel 58. Lens 130 and filter 132 are mounted within an enclosure 133 which has an externally threaded fitting 131 projecting rearwardly therefrom for cooperating with a nut 129 and a washer 127 for mounting assembly 126 to projection 128. An optical fiber 134 is received in fitting 131 for directing collimated light energy from a suitable laser or other suitable source (not shown) through lens 130 and filter 132.

A plane dividing wall 140 projects upwardly from chassis surface 52. An optical assembly 142 comprising a negative lens 144 is carried on a side of wall 140 remote from guides 56, 98 and is disposed to receive collimated light energy from a suitable laser source 145 (FIG. 5). A pair of plane mirrors 146, 148 are mounted on corresponding substrates 147, 149 in fixed position on wall 140 and have respective lateral dimensions essentially parallel to the plane of chassis surface 52. As best seen in FIG. 5, mirror 146 is carried generally above assembly 142 and is angulated rearwardly, while mirror 148 is mounted adjacent surface 52 and is angulated forwardly. A third plane mirror 150 is mounted on a substrate 151 in fixed position on wall 140 intermediate mirrors 146,148 at a forwardly inclined angle, and at an angle in the lateral direction, with respect to the surface 52 of chassis, 46 as best seen in FIGS. 5 and 6. A fourth plane mirror 152 is mounted on a substrate 153 carried on the end of a shaft 154 on-axis with optical assembly 142. Shaft 154 is rotatably coupled through a bushing 300 and a two-position detent clutch 302 to a coaxial shaft 304. A drive sprocket 160 is mounted on the clutch-remote end of shaft 304. A paddle 306 is mounted on shaft 304 for manually setting the projection apparatus to a selected recording standard in a manner to be described.

A guide track 162 having a central channel 164 (FIGS. 2 and 6) is mounted on a bracket 308 carried by chassis 46 in front of the right-most socket 40 (viewed from the front) at an angle of 90° with respect to chassis surface 52. A projection lens assembly 170 is mounted on a slide 172 which has a guide base 174 projecting into channel 164 of guide track 162. Optical assembly 170 includes a positive lens 310 fixedly carried with respect to slide 172 and a negative lens 312 adjustable axially with respect to lens 310. Lens 312 is coupled to a motor (not shown) carried internally of slide 172 and thence to control unid 28 (FIGS. 1 and 2) for focusing the projected image in the usual manner. A motor 180 is mounted adjacent the lower end of guide 162 and is coupled to guide base 174 by the lead screw 182 which projects upwardly through channel 162. The motor-remote end of lead screw 182 is journaled in a bearing 183 in channel 164 which also functions as an upper stop for guide 172. A pair of limit switches 184, 186 are mounted on bracket 308 adjacent the lower and upper ends of guide track 162, and have the respective switch actuators 188, 190 disposed to be responsive to slide 172 at preselected lower and upper limits of slide travel. Motor 180 and switches 184, 186 are coupled by cable 32 (FIGS. 1 and 2) to control unit 28.

A drive chain 192 is coupled at one end to slide 172 and is looped therefrom over an idler sprocket 194 mounted on a shaft 195 threaded into the upper end of guide 162. From idler sprocket 194, chain 192 extends to sprocket 160 mounted to shaft 154 and then over a second idler sprocket 196 mounted on a shaft 197 (FIG. 6) mounted adjacent the lower end of guide 162. From sprocket 196, chain 192 extends and is coupled at its second end to slide 172. Thus, chain 192 is looped from slide 172 over the various sprockets 160, 194, 196, with the reach of chain 192 between sprockets 194, 196 being parallel to the axis of channel 164. It will therefore be evident that shaft 154 rotates the mirror 152 pivots with respect to the axis of lens assembly 142 (FIG. 5) as a function of position of slide 172 on guide track 162 as controlled by motor 180 and lead screw 182. All internal components of the display unit are molded or painted flat black to reduce internal reflection.

A cassette 198 for storage, handline and display of holographic film prerecorded in an arcuate format is shown mounted in the display apparatus in FIGS. 2-5 and is illustrated in detail in FIGS. 7-9. Cassette 198 preferably comprises a pair of spools 200, 202 and a length of prerecorded holographic film 204 having longitudinal ends affixed such that film 204 is adapted to be wound lengthwise around spools 200, 202. Cassette 198 further includes a frame assembly 206 positioning spools 200, 202 in laterally spaced parallel relation and guiding the portion of film 204 extending therebetween through an arcuate film path of preselected radius of curvature R (FIG. 8). More specifically, and referring in detail to FIGS. 7-9, spool 200 comprises a central shaft 208 having a pair of externally splined sprockets 210, 212 molded onto axially opposed shaft ends. A pair of circular flanges 216 integrally project from shaft 208 near the respective ends thereof between the axial ends of sleeve 214 and sprockets 210, 212.

Frame assembly 206 comprises the separate one-piece front and rear portions 218, 220. Front frame portion 218 includes an arcuate window 222 which is generally rectangular in dimension and which is defined in part at upper and lower opposed edges by the respective arcuate guide bushings 224, 226 extending in corresponding grooves between spools 200, 202 at radius of curvature R. Bushings 224, 226 are vertically spaced from each other by a dimension corresponding to the preselected width of film 204 so as to capture opposed side edges of the film portion extending between spools 200, 202 and thereby to guide the film past window 222 at the radius of curvature R. The centrol portion of rear frame section 220 is open, as best seen in FIG. 7, so as to provide a clear space for illumination of film 204 in window 222. The lateral edges of front and rear frame sections on either side of window 222 comprise part-cylindrical hollow enclosures 225, 227 which cooperate to capture spools 200, 202. More particularly, and as best seen in FIG. 9, a pair of upper and lower part-circular channels 228 in each front enclosure 225 cooperate with a pair of part-circular channels 230 in each rear enclosure 227 to form a circular channel or recess for receiving and capturing the peripheries of upper and lower centrally apertured washers 232. Washers 232 cooperate with flanges 216 on spool shaft 208 for rotatably capturing the spools 200, 202 within the frame assembly. Preferably, all parts of cassette 198, with the exception of film 204, are molded of suitable plastic material such as ABS with or without reinforcement.

FIG. 10 schematically illustrates a technique for recording 360° holograms on a cylindrical film belt in accordance with the technique described in detail in the above-referenced Upatnieks et al prior art publication. The purposes and functions of the beam splitters BS, mirrors M and pinhold lens arrangements LP for recording a 360° hologram of the object O are well understood by persons skilled in the are and described in the referenced Upatnieks et al publication. It will be understood in particular that the height H of the upper pinhole lens above the object O may be a predetermined function of the radius of curvature R of the film belt. In accordance with an important feature of the invention, the apparatus herein described is specifically adapted for use in displaying, in either the viewing or projecting modes of operation, cassettes containing film prerecorded at either of two standard radii of curvature, preferably 30 cm and 60 cm. The recording height H for these standard radii of curvature are 38 cm and 76 cm respectively.

FIG. 14 illustrates the control buttons 30 on control unit 28 (FIGS. 1 and 2). Buttons 30 includes a power-on push button 312 for controlling application of utility power to all unit motors and light sources, etc. A pair of momentary contact push buttons 314, 316 select between the two preselected recording standards. Four momentary contact push buttons 318, 320, 322 and 324 are coupled to motors 44 (FIGS. 2 and 4) for driving cassette film 204 either fast left (318), fast right (320), slow left (322) or slow right (324). A pair of momentary contact rocker switches 326 and 328 are used in the projector mode of operation, switch 326 being for positioning slide 172 (FIG. 6) and lens 170 in the desired vertical position, and switch 328 being for focusing projection lens 170 as previously described. Suitable electronics for operating motors 44 (FIGS. 2 and 4), 82, 118, 180 (FIGS. 5 and 6), and the projection lens focusing motor (not shown) within slide 172 will be self-evident to the artisan.

Considering first the viewer mode of operation, a cassette at one of the two standard recording configurations is selected and placed in the viewer assembly such that the cassette sprockets 210 or 212 are received in the drive sockets 40 (as shown in FIGS. 2-5). Cover 14 is then closed and buttons 314, 316 of control unit 28 are manipulated by an operator to select the particular standardized recording configuration embodied in the loaded cassette. In particular, it will be appreciated that, inasmuch as recording height H (FIG. 10) varies with the selected standard radius of curvature R, the effective distance between the point light source simulared by assembly 126 and the illuminated film in cassette 198 must likewise be varied. To accomplish this adjustment, mirror assemblies 66, 100 (FIGS. 2-4) are positioned by motors 82, 118 under control of unit 28 in correspondence with the selected standard recording configuration.

More specifically, and referring to FIG. 11, for the standard recording radius of curvature R of greater dimension, mirror assemblies 66, 100 are moved by the corresponding drive motors to the positions illustrated in solid lines for providing a first beam path of greater length between the apparent point light source at pinhole filter 132 and the holographic film 204 in the cassette viewing window 222. For the recording standard radius of curvature of lesser dimension, the mirror assemblies 66, 100 are moved to the positions illustrated in phantom lines for providing a beam path of lesser dimension from pinhole filter 132 to film 204. As the mirror assemblies 66, 100 are moved linearly in their corresponding guide tracks 56, 98 by the motors, the angles of the respective mirrors with respect to each other and with respect to the axis of pinhole filter 132 are automatically controlled through cam slots 78, 114 by controlled pivoting of the respective mirrors about axes perpendicular to the light path, so that light from the pinhole filter will be directed onto the film in the cassette window at all mirror positions.

Limit switches 86, 84 (FIGS. 2-4) associated with mirror assembly 66 and limit switches 122, 120 associated with mirror assembly 100 cooperate with motor control circuitry in unit 28 for defining nominal positions of the respective mirror assemblies in each recording convention. Preferably, for fine focusing of the viewed image, additional motor control circuitry (not shown) is provided for limited controlled movement of the respective mirrors following course positioning of the mirrors under control of the limit switches. It will be appreciated that, for the standard recording radii previously noted, the effective beam path for the greater radius must have a length (60 cm) exactly twice the length (30 cm) for the lesser radius. Once the image has been focused, the object recorded on film 204 may be viewed from any angle by an operator by energizing the film spool drive servo-motors 44 in either direction using control unit 28.

Turning next to the projector mode of operation, a selected cassette is inserted into the display unit in inverted orientation as previously described and the unit is set for the standard recording configuration of that cassette. Such adjustment is accomplished manually with cover 14 (FIGS. 1 and 4) open by manipulation of paddle 306 so as to set two-position detent clutch 302 to the desired standard. Considering first the standard recording configuration of greater radius of curvature, the angle of mirror 152 is preset as illustrated in FIG. 12 so as to reflect collimated light received from lens 144 onto mirrors 150, 146 and 148 in succession, and thence onto film 204. It will be appreciated that the cassette must be loaded in the inverted orientation in the projector mode of operation since the illumination beam is directed thereon from beneath rather than above the cassette film, and lens assembly 170 effectively inverts the projected image. Motors 44, 180 (FIGS. 2, 5 and 6) are then controlled by an operator by means of unit 28 so as to position projection lens assembly 170 over a desired portion of the prerecorded film. Simultaneously, the mirror 152 is rotated by drive chain 192, etc. as previously described so as to effectively scan the recorded film in the vertical direction in synchronism with lens assembly 170 between the beam paths illustrated in solid and phantom lines in FIG. 12, which respectively correspond to the extreme lower and upper positions of the projection lens assembly 170.

For the standard recording radius of lesser dimension, mirror 152 is manually prepositioned in the orientation illustrated in FIG. 13 for directing an illumination beam from lens 144 directly onto mirror 148 and thence onto film 204. Again, projection lens assembly 170 and mirror 152 are conjointly controlled by unit 28 (FIG. 2) and motor 180 for effectively directing the illumination beam so as to sweep the recorded film between extreme positions illustraded in solid and phantom lines. As with the viewer mode of operation previously described, the longer beam path (FIG. 12) for the larger standard radius previously described will be exactly twice the length for the lesser radius.

Although the invention has been described in detail in connection with two standard recording conventions or techniques, it will be appreciated that the invention in its broadest aspects is useful even where no standard recording dimensions are specified, provided that the actual recording dimensions, and specifically the height H (FIG. 10), is within the achievable limits of the apparatus dictated by the limits of travel of the mirrors 66, 100 and 152. Similarly, a plurality of intermediate recording conventions may be accommodated by providing an additional plurality of limit switches at preselected positions intermediate the various limit switches hereinabove described or by manual adjustment of the mirrors to the desired positions.

The use of fiber optics 134 to couple the viewer optics to a laser source is particularly adventageous since it permits a plurality of viewers to be operated from a single laser. Cassettes 198 can accommodate a number of film segments connected end-to-end, so that a number of recorded objects may be viewed or projected without changing cassettes. The cassette films may, of course, be reproduced by any conventional laser contact technique.

The invention claimed is:

1. A cassette for storage, handling and display of holographic film prerecorded in an arcuate film configuration at least partially surrounding the recorded object at a prespecified fixed radius, said cassette comprising first and second film spools, a length of said holographic film extending between said film spools, and a frame including spaced end portions mounting said spools for free rotation about spaced parallel axes on a common plane and a central portion affixed to and rigidly extending between said end portions on one side of said plane, said central portion including first means providing an arcuate film path extending between said spools at a fixed uniform radius of curvature equal to said prespecified radius, with said radius of curvature being centered on a side of said plane opposite said path, and second means providing a through window for illumination of film extending between said spools from a direction transverse to said path.

2. The cassette set forth in claim 1 for storage, handling and display of film of predetermined width wherein said first means comprises opposed arcuate channels for receiving and guiding laterally spaced edges of said film.

3. The cassette set forth in claim 2 wherein each of said spools comprises an axial body and a pair of circular flanges radiating from axial ends of said body, and wherein said frame comprises opposed inner and outer sections including means for loosely capturing said circular flanges in assembly such that said spools are free to rotate.

4. Apparatus for displaying images from holographic film prerecorded in an arcuate film configuration at least partially surrounding the recorded object at one of at least two prespecified fixed recording radii, said apparatus comprising means for receiving said film including means for holding at least a portion of said film at said one of said at least two prespecified fixed recording radii, a source of an illumination light beam, a plurality of mirrors for directing light along a light path from said source onto said portion of said film, and means for adjustably orienting at least one of said plurality of mirrors to orientations with respect to others of said mirrors in correspondence with said at least two recording radii so as to vary the length of said light path from said source to said film between at least two predetermined lengths corresponding to said at least two recording radii.

5. The apparatus set forth in claim 4 wherein said means for adjustably orienting at least one of said mirrors comprises means for translating said at least one mirror between at least first and second positions corresponding to said two predetermined path lengths, and means for pivoting said at least one mirror between first and second angles with respect to said light source at said first and second positions respectively.

6. The apparatus set forth in claim 4 wherein said plurality of mirrors includes first mirrors mounted in fixed position with respect to said means for receiving said film and a second mirror mounted to pivot about an axis transverse to said light path for selectively directing light from said source onto said first mirrors and thence onto said film through differing light paths.

7. The apparatus set forth in claim 4 for viewing said holographic film wherein said source comprises means for providing an apparent point light source, wherein said plurality of mirrors comprises first and second folding mirrors for directing light from said apparent point source onto said portion of said film, and wherein said means for adjustably orienting said mirrors comprises first and second support means mounting said first and second mirrors to pivot about parallel axes perpendicular to said light path, first and second guide means mounting said first and second support means, means for translating each said support means within the corresponding said guide means so as to adjustably position said first and second mirrors with respect to each other and to said light source, and means for pivoting said mirrors as said support means translates within said guide means such that light from said light source is directed by said first mirror onto said second mirror and then onto said portion of said film at all positions of said support means within said respective guide means.

8. The apparatus set forth in claim 7 wherein said means for pivoting said mirrors comprises cam means mounted adjacent each said guide means and follower means carried by each of said first and second mirrors in engagement with the corresponding said cam means.

9. The apparatus set forth in claim 7 or 8 wherein said means for adjustably orienting said mirrors further comprises means responsive to an operator of said apparatus for selectively translating said support means within said guide means.

10. The apparatus set forth in claim 9 further comprising limit switch means mounted adjacent each said guide means for defining first and second nominal positions of said support means, and wherein said mirrors respectively corresponding to said two recording radii.

11. The apparatus set forth in claim 4 for projecting a portion of the recorded holographic image onto a planar surface wherein said mirrors comprise first mirror means mounted in fixed position and second mirror means mounted to rotate about an axis perpendicular to said light path to direct light from said source onto said first mirrors and then onto said portion of said film through light paths of differing lengths corresponding to said at least two recording radii.

12. The apparatus set forth in claim 11 wherein said second mirror means is further adapted to rotate about said axis to scan said portion of said film, and wherein said apparatus further comprises projection means operatively coupled to said second mirror means to scan said film conjointly with said second mirror means.

13. The apparatus set forth in claim 4, 7 or 11 wherein said means for receiving said film is adapted to receive said film in the form of a prepackaged cassette comprising a pair of laterally spaced film spools, a length of film extending between and attached to said spools and a frame including spaced end portions mounting said spools for free rotation about spaced parallel axes on a common plane and a central portion affixed to and rigidly extending between said portions on one side of said plane, said central portion including first means providing an arcuate film path extending between said spools at a fixed radius of curvature equal to one of said at least two recording radii, with said radius of curvature being centered on a side of said plane opposite said path, and second means providing a through window for illumination of film extending between said spools.

14. The apparatus set forth in claim 13 wherein said means for receiving said film is adapted to receive a said prepackaged cassette having drive sprocket means affixed to each of said spools, and wherein said apparatus further comprises operator responsive means coupled to said drive sprocket means for rotating said spools and thereby varying the said portion of said film illuminated by said light beam.

15. The combination comprising a cassette for storage and display of holographic film prerecorded in an arcuate film configuration at least partially surrounding the recorded object at one of at least two prespecified fixed recording radii and apparatus for displaying said film, said cassette including a pair of laterally spaced spools, a length of prerecorded film having ends attached to said spools and frame means supporting and extending between said spools to guide a portion of said film between said spools over a film path having a fixed radius of curvature equal to one of said at least two prespecified fixed recording radii, said apparatus comprising means for receiving a said cassette including means adapted to engage said spools for translating said film in the direction of its length, a light source, a plurality of mirrors for directing light along a light path from said source to illuminate said portion of said film and means for adjustably orienting at least one of said plurality of mirrors to predetermined orientations with respect to other of said mirrors, with said orientations corresponding to said at least two prespecified recording radii so as to vary the length of said light path from said source to said film between at least two predetermined lengths corresponding to said at least two recording radii.

16. Apparatus for displaying images from holographic film prerecorded in an arcuate film configuration at least partially surrounding the recorded object at a fixed recording radius within a prespecified range, said apparatus comprising means for receiving said film including means for holding at least a portion of said film at said fixed recording radius, a source of illumination light, a plurality of mirrors for directing light along a light path from said source onto said portion of said film, and means for adjustably orienting at least one of said plurality of mirrors to orientations with respect to other of said mirrors so as to vary the length of said light path from said source to said film over a range of path lengths corresponding to said prespecified range of recording radii.

* * * * *